(12) United States Patent
Sasaki

(10) Patent No.: US 9,264,698 B2
(45) Date of Patent: Feb. 16, 2016

(54) LENTICULAR LENS, IMAGE GENERATION APPARATUS, AND IMAGE GENERATION METHOD

(75) Inventor: Yoshitaka Sasaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 387 days.

(21) Appl. No.: 13/205,798

(22) Filed: Aug. 9, 2011

(65) Prior Publication Data

US 2012/0050486 A1   Mar. 1, 2012

(30) Foreign Application Priority Data

Sep. 1, 2010   (JP) ................................. 2010-195707

(51) Int. Cl.
*H04N 13/02* (2006.01)
*H04N 13/04* (2006.01)

(52) U.S. Cl.
CPC ....... *H04N 13/0406* (2013.01); *H04N 13/0257* (2013.01); *H04N 13/0422* (2013.01)

(58) Field of Classification Search
CPC .......... H04N 13/0242; H04N 13/0404; H04N 13/0402; H04N 13/0257
USPC .......... 382/206; 359/626; 348/46, 51
See application file for complete search history.

(56) References Cited

U.S. PATENT DOCUMENTS

| | | | |
|---|---|---|---|
| 7,480,100 B1 * | 1/2009 | Raymond et al. ............. | 359/626 |
| 2002/0054207 A1 * | 5/2002 | Iizuka et al. .................... | 348/54 |
| 2008/0170764 A1 * | 7/2008 | Burns et al. ................... | 382/128 |
| 2008/0310712 A1 * | 12/2008 | Edgar ............................ | 382/167 |
| 2009/0232355 A1 * | 9/2009 | Minear et al. ................. | 382/103 |
| 2010/0098340 A1 * | 4/2010 | Zomet et al. .................. | 382/206 |
| 2010/0165089 A1 * | 7/2010 | Liang et al. .................... | 348/66 |
| 2010/0309300 A1 * | 12/2010 | Chhibber et al. .............. | 348/77 |
| 2011/0007138 A1 * | 1/2011 | Zhang et al. ................... | 348/50 |
| 2011/0085715 A1 * | 4/2011 | Yan et al. ....................... | 382/128 |
| 2011/0157323 A1 * | 6/2011 | Chen et al. ...................... | 348/51 |
| 2012/0177284 A1 * | 7/2012 | Wang ............................. | 382/154 |

FOREIGN PATENT DOCUMENTS

| | | |
|---|---|---|
| JP | H7-327141 A | 12/1995 |
| JP | 10-285459 A | 10/1998 |
| JP | 10-319214 A | 12/1998 |
| JP | 2002-033931 A | 1/2002 |
| JP | 2006-279149 A | 10/2006 |
| JP | 2010-179573 A | 8/2010 |

\* cited by examiner

*Primary Examiner* — Tung Vo
*Assistant Examiner* — Rowina Cattungal
(74) *Attorney, Agent, or Firm* — Canon USA, Inc. IP Division

(57) ABSTRACT

An image generation apparatus to generate an image includes an acquisition unit, an input unit, and a generation unit. The acquisition unit acquires image data. The input unit inputs brightness information with respect to the image data and lens characteristics of a lenticular lens. The generation unit generates a plurality of pieces of image data which is varied in brightness for being synthesized to the lenticular lens based on the brightness information and the lens characteristics.

15 Claims, 13 Drawing Sheets

LENTICULAR LENS, IMAGE GENERATION APPARATUS, AND IMAGE GENERATION METHOD

BACKGROUND OF THE INVENTION

1. Field of the Invention

The present invention relates to a lenticular lens, and an image generation processing for a lenticular lens.

2. Description of the Related Art

In recent years, the development of devices dealing with images such as a digital camera, a display, and a printer, has driven demand for the reproduction of the texture of the subject, three-dimensional view, and the like.

For example, regarding the reproduction of the texture, Japanese Patent Application Laid-Open No. 10-285459 discusses a technique in which an input video signal representing an image is corrected based on a reflection light model to reproduce metallic luster. In this technique, the metallic luster is reproduced based on a luminance signal in the input video signal.

Apart from this, there is known a phenomenon in which, when images of low correlation are presented before the right and left eyes of an observer, no fusion occurs, and one of the images being predominant over the other is alternately observed. This phenomenon is called binocular rivalry since the images observed fluctuate in an unstable manner with the passage of time, and the right and left eyes seem to view with each other to observe the images. Further, as is known in the art, when images of differing in luminance are presented before the right and left eyes, there is generated a luster texture called binocular luster.

Regarding the three-dimensional view, Japanese Patent Application Laid-Open No. 10-319214 discusses a method according to which a lenticular lens is used to present parallax images before the right and left eyes of the observer to realize a three-dimensional view. According to the method, three-dimensional reproduction is realized through a combination of images obtained by dividing a plurality of parallax images into rectangular portions and synthesizing them and a lenticular lens according to the characteristics of the lenticular lens.

In general, the luster of an object, for example a state of shining by reflected light for an object, greatly depends on bidirectional reflectance distribution function (BRDF), a four-dimensional function that defines how light is reflected at an opaque surface. BRDF represents reflectance with respect to the incident angle and the output angle of the surface of an object. The lower the luster of the object, the less the BRDF depends on the incident angle and the output angle but is a substantially fixed value. The higher the luster of an object, the larger the value of the minor surface reflection component. In other words, there is a great difference in image brightness between a region of high luster and a region of low luster in an image of the object.

Each of the devices and media dealing with images has a brightness range that the device or the medium can reproduce the image. Thus, when an image including subjects differing in luster is output from a device to a medium of a small brightness reproduction range such as a sheet of paper having a matte paper finish, the difference in brightness between the high luster region and the lower luster region cannot be reproduced to a sufficient degree, with the result that the luster texture is impaired.

SUMMARY OF THE INVENTION

The present invention is directed to utilizing the characteristics of a lenticular lens to reproduce luster texture.

According to an aspect of the present invention, an image generation apparatus to generate an image includes: an acquisition unit configured to acquire image data; an input unit configured to input brightness information with respect to the image data and lens characteristics of a lenticular lens; and a generation unit configured to generate a plurality of pieces of image data which is varied in brightness for being synthesized to the lenticular lens based on the brightness information and the lens characteristics.

According to another aspect of the present invention, a lenticular lens includes: a base lenticular lens constituted by a plurality of lenses; and an image in which images differing in brightness are arranged within a width of each of the plurality of lenses constituting the base lenticular lens.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Figure 1:
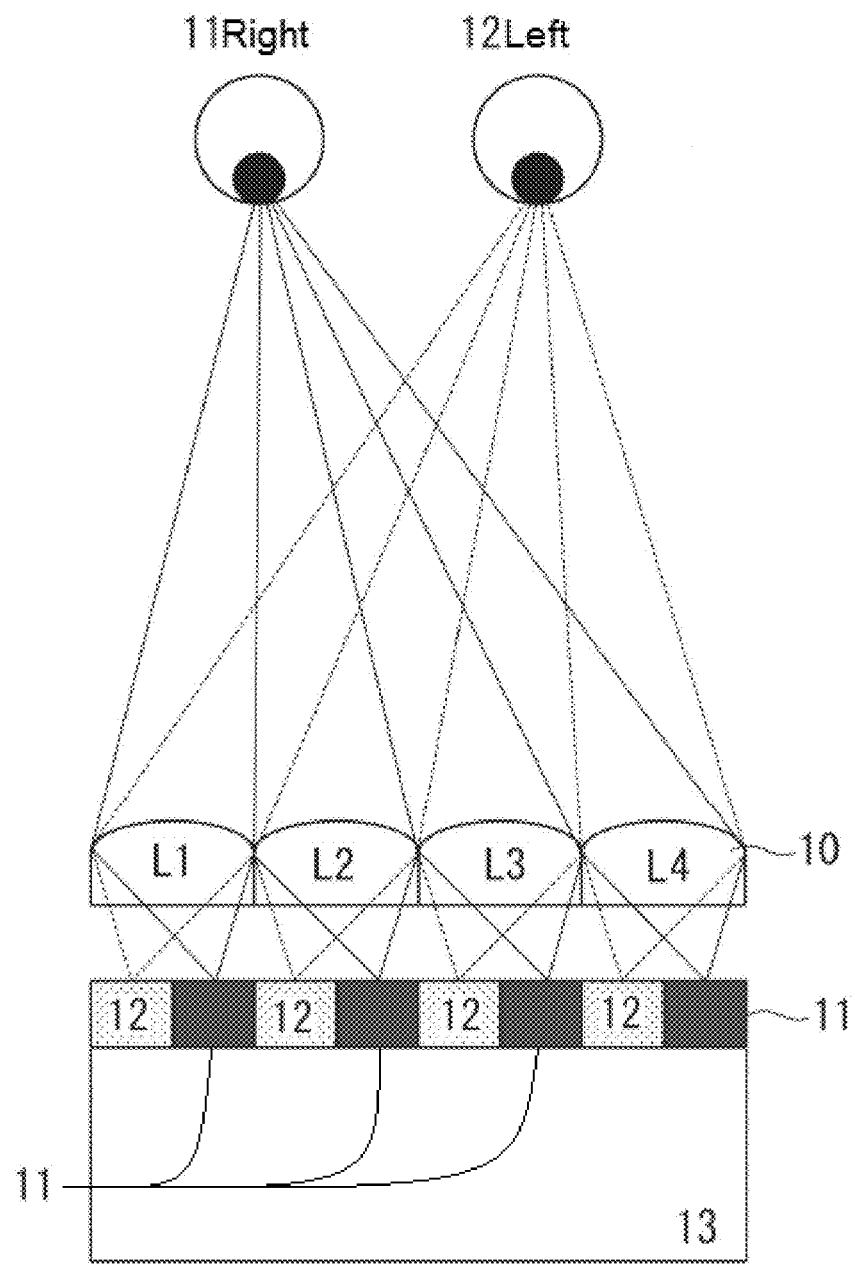
FIG. 1 is a schematic diagram illustrating the principle of a lenticular lens.

Various exemplary embodiments, features, and aspects of the invention will be described in detail below with reference to the drawings.

In the following, image processing according to the exemplary embodiments will be described in detail with reference to the drawings. There will be described image generation processing for a lenticular lens that can reproduce luster texture independently of the luminance reproduction range of a device, medium, such as a sheet of paper having a matte paper finish, and the like. The same components will be indicated by the same reference numerals.

[Lenticular Lens]

A lenticular lens is an array of magnifying lenses, designed so that when viewed from slightly different angles, different images are magnified. An example of a lenticular lens is the lenses used in lenticular printing, where the technology is used to give an illusion of depth, or to make images that appear to change or move as the image is viewed from different angles. An image observed through a lenticular lens will be described with reference to the schematic diagram in FIG. 1.

As illustrated in FIG. 1, an image 11 for the right eye 11Right hereinafter referred to as the right-eye image 4 11, and an image 12 for the left eye 12Left, hereinafter referred to as the left-eye image 12, on a medium 13, are respectively divided into rectangular image portions (hereinafter referred to as the rectangular images), which are arranged alternately. In addition, when the rectangular images thus alternately arranged are observed through a lenticular lens 10 having lenticules L1, L2, L3, and L4, the right-eye image 11 and the left-eye image 12 are presented separately. Thus, when the right-eye and left-eye images 11 12 are images with the parallax of both eyes 11Right, 12Left (hereinafter referred to as the parallax images), it is possible to obtain a three-dimensional view from the rectangular images alternately arranged.

When the right-eye image 11 and the left-eye image 12 are not parallax images but two images 11 12 differing in brightness, there is observed an image with luster texture due to the binocular luster. For example, when the right-eye image 11 is a low luster texture region 11 and the left-eye image 12 is a high luster texture region 12, images of differing in luminance are presented before the right and left eyes 11Right, 12Left such that there is observed an image with luster texture due to the binocular luster. In the related art, when an image including subjects differing in luster is output to a medium of a small brightness reproduction range such as a sheet of paper having a matte paper finish, the difference in brightness between the high luster region and the lower luster region cannot be reproduced to a sufficient degree, with the result that the luster texture is impaired. In contrast, there will be described image generation processing, such as for a lenticular lens 10 (and lenticular lens 1004 of FIG. 10). The described processing can reproduce luster texture of an electronic image, represented by image data, by generating synthesized image data independent of the luminance reproduction range of a target device, medium, and the like. When the synthesized image data is transmitted to an image output apparatus, such as a printer connected to the general-purpose interface, the printer uses the synthesized image data to impart a printed image onto a printed medium, for example, of a small brightness reproduction range. Due to the synthesized image transmitted to the printer, the printed image reproduces the luster texture of the electronic image.

[Apparatus Configuration]

Figure 2:
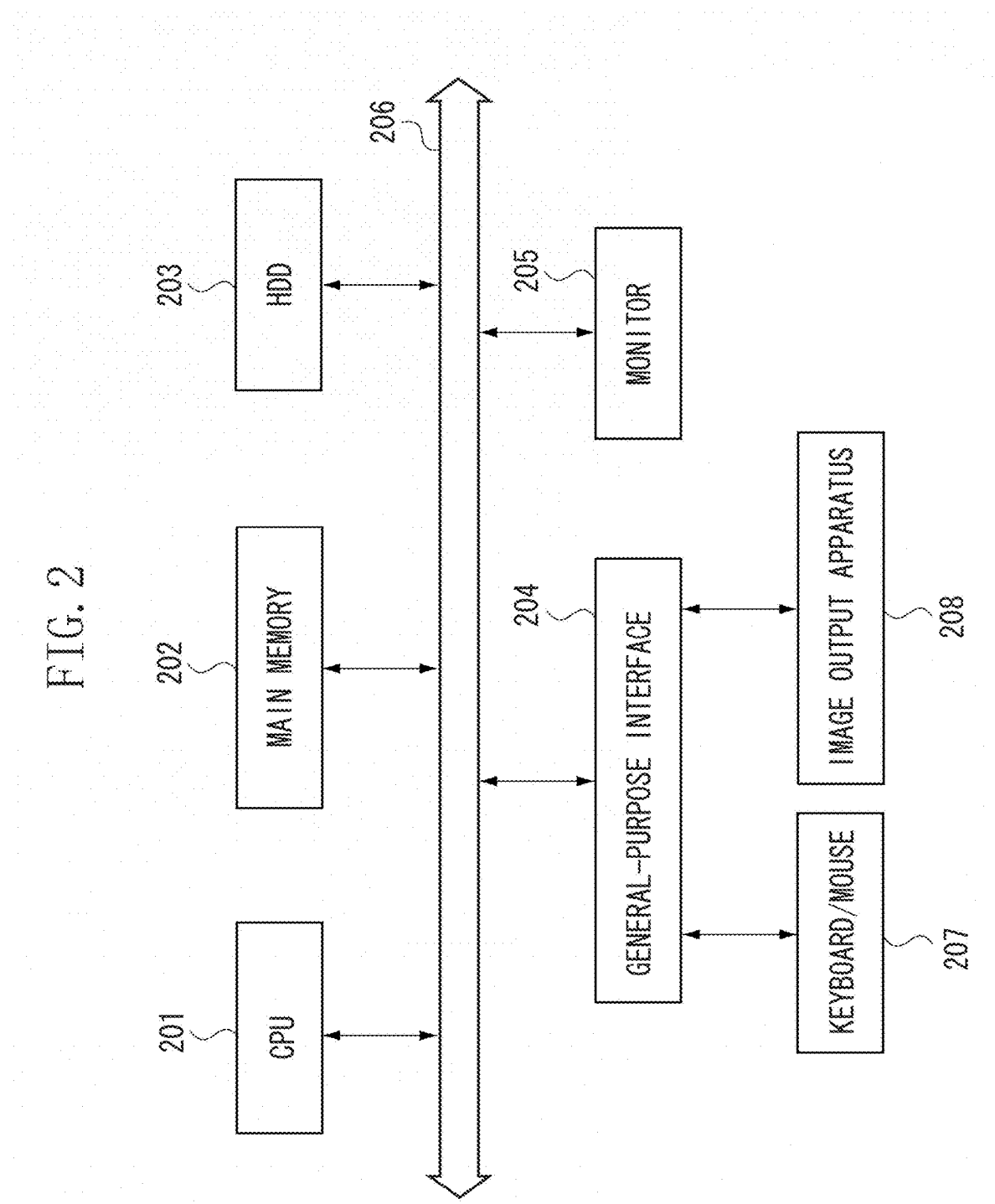
FIG. 2 is a block diagram illustrating a configuration example of an image generation apparatus.

An example of the configuration of an image generation apparatus according to the present exemplary embodiment will be described with reference to the block diagram in FIG. 2. The image generation apparatus is equipped with a central processing unit (CPU) 201, a main memory 202, a hard disk drive (HDD) 203, a general-purpose interface 204, a monitor 205, and a main bus 206. The general-purpose interface 204 connects an interface 207 such as a keyboard or mouse, an image output apparatus 208, etc. to the main bus 206.

The various types of processing described below are realized by the CPU 201 which operates various types of software (computer programs) stored in a read-only memory (ROM) in the main memory 202 and the HDD 203 using a random-access memory (RAM) of the main memory 202 as work memory.

First, the CPU 201 starts an image processing application stored in the HDD 203, and expands it in the main memory 202 while displaying a user interface in the monitor 205. Subsequently, data stored in the HDD 203 and data input from the interface 207 connected to the general-purpose interface 204 are transferred to the main memory 202 via the main bus 206 according to a command from the CPU 201. Further, in accordance with the processing in the image processing application, the data stored in the main memory 202 is subjected to computation, and the computation result is displayed on the monitor 205 via the main bus 206, stored in the HDD 203, and output to the image output apparatus 208 based on the command from the CPU.

[Functional Configuration for Image Processing]

Next, in accordance with an instruction given by the user, the image processing application inputs image data, brightness information, and lenticular lens characteristics (hereinafter referred to as the lens characteristics), and generates image data of an image to be combined with the lenticular lens from these pieces of data. This processing will be described with reference to FIG. 3.

Figure 3:
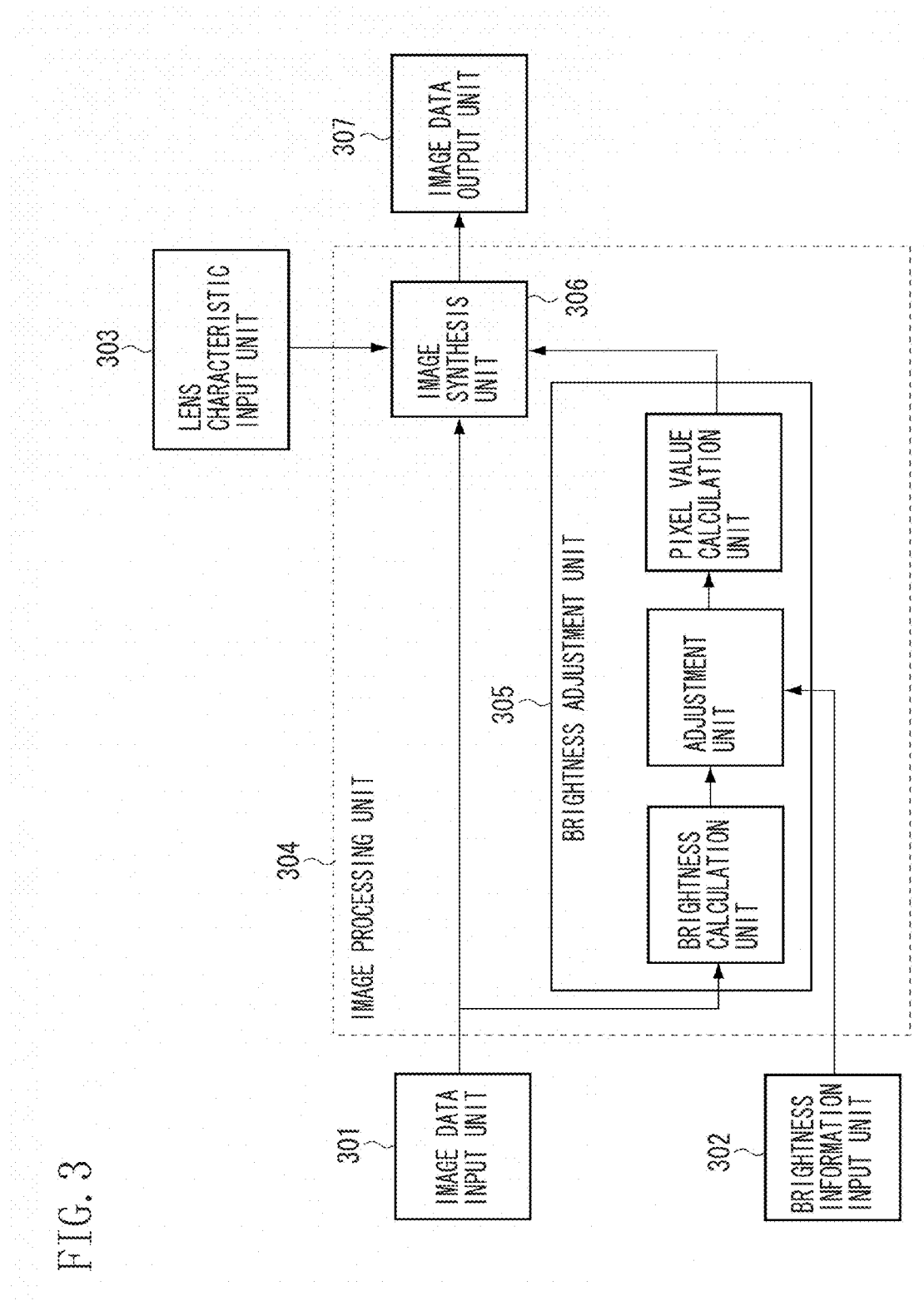
FIG. 3 is a block diagram illustrating an example of the logic composition in the image generation apparatus.

An example of the functional configuration of the image generation apparatus will be described with reference to the block diagram in FIG. 3. As described above, the functional configuration of the present exemplary embodiment described with reference to FIG. 3 is realized as image generation application software.

An image data input unit 301 acquires image data of an object image, for example, from the HDD 203. A brightness information input unit 302 inputs brightness information including a brightness difference, a brightness value, or the like to be used for brightness adjustment. A lens characteristics input unit 303 inputs the lens characteristics of the lenticular lens from, for example, the HDD 203.

Based on the pieces of data input to the lens characteristics input unit 303 from the image data input unit 301, an image processing unit 304 outputs to an image data output unit 307 image data of a luster reproduction image on which there is executed image generation processing to impart a luster texture to the object image.

A brightness adjustment unit 305 generates brightness-adjusted image data, in which brightness of an input image is adjusted based on the image data input by the image data input unit 301 and the brightness information input by the brightness information input unit 302.

An image synthesis unit 306 generates synthesized image data based on the image data input by the image data input unit 301, the brightness-adjusted image data generated by the brightness adjustment unit 305, and the lens characteristics input by the lens characteristics input unit 303.

The image data output unit 307 outputs the synthesized image data generated by the image synthesis unit 306 to the image output apparatus 208.

[Image Generation Processing]

Figure 4:
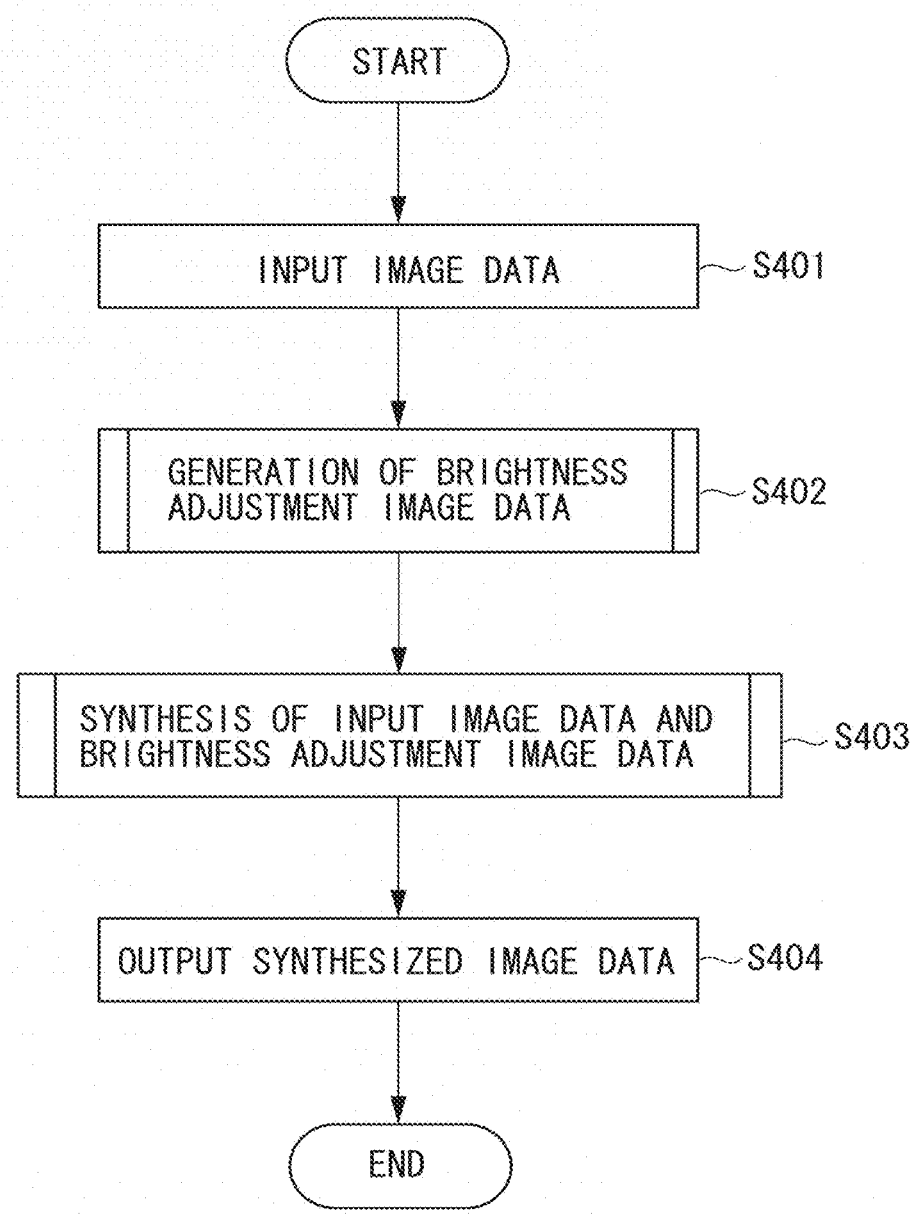
FIG. 4 is a flowchart illustrating image generation processing.

Image processing by the functional configuration of the image generation apparatus in FIG. 3 will be described in detail below with reference to the flowchart in FIG. 4.

In step S401, the image processing unit 304 is input image data from the image data input unit 301.

In step S402, based on the brightness information including the brightness difference and the brightness value input from the brightness information input unit 302, the brightness of the input image acquired in step S401 is adjusted, and brightness-adjusted image data is generated. The brightness-adjusted image data generation processing will be described in detail below.

In step S403, based on the lens characteristics including a lens orientation and a lens width input from the lens characteristics input unit 303, the input image data acquired in step S401 and the brightness-adjusted image data generated in step S402 are synthesized. The synthesized image data generation processing will be described in detail below.

The input data such as the image data, the brightness information, and the lens characteristics may be input by an arbitrary method. For example, data stored in the HDD 203 may be read, or the brightness information may be input based on a user instruction from the interface 207 such as a keyboard or a mouse. Further, it is also possible to input the data from an external storage device, a digital camera or the like connected via the general-purpose interface.

In step S404, the synthesized image data generated in step S403 is output from the image data output unit 307. Here, the generated image data may be output to an arbitrary device. For example, the data may be stored in the external storage device connected via the HDD 203 and the general-purpose interface 204, or it may be output to an image output apparatus such as a printer connected to the general-purpose interface.

[Brightness-Adjusted Image Data Generation Processing]

With reference to FIGS. 5 through 8, the brightness-adjusted image generation processing in step S402 will be described in detail below along with an example of the brightness adjustment processing.

Figure 6:
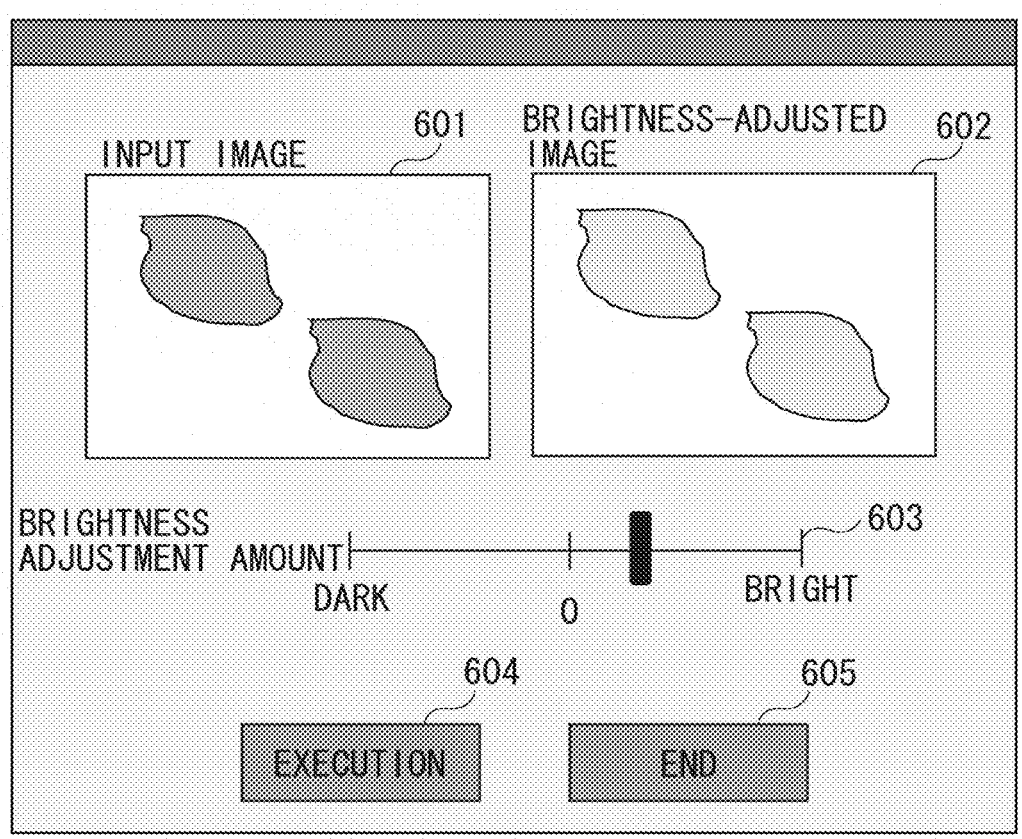
FIG. 6 is a schematic diagram illustrating an example of a user interface giving an instruction for brightness adjustment.

First, the acquisition of the brightness information referred to at the time of generation of the brightness-adjusted image will be described. Referring to FIG. 6, an example will be described in which a user instruction is input from a user interface (UI) called up from the image generation application software and displayed on the monitor 205. The interface for adjusting the brightness information is not limited to the one as illustrated in FIG. 6. An arbitrary interface can be adopted so long as it can input the requisite brightness information for the generation of the brightness-adjusted image.

In FIG. 6, an input image display region 601 is a region where the input image is displayed. A preview display region 602 is a region for previewing the result of the adjustment of the brightness of the input image based on the user instruction. A slider bar 603 is an adjustment unit for inputting brightness difference as the brightness information with respect to the brightness adjusted using the brightness of the input image as a reference. An execution button 604 is used to input an instruction to generate a brightness-adjusted image based on the brightness information indicated by the slide bar 603. An end button 605 is used to input an instruction to end the brightness-adjusted image generation processing.

Figure 5:
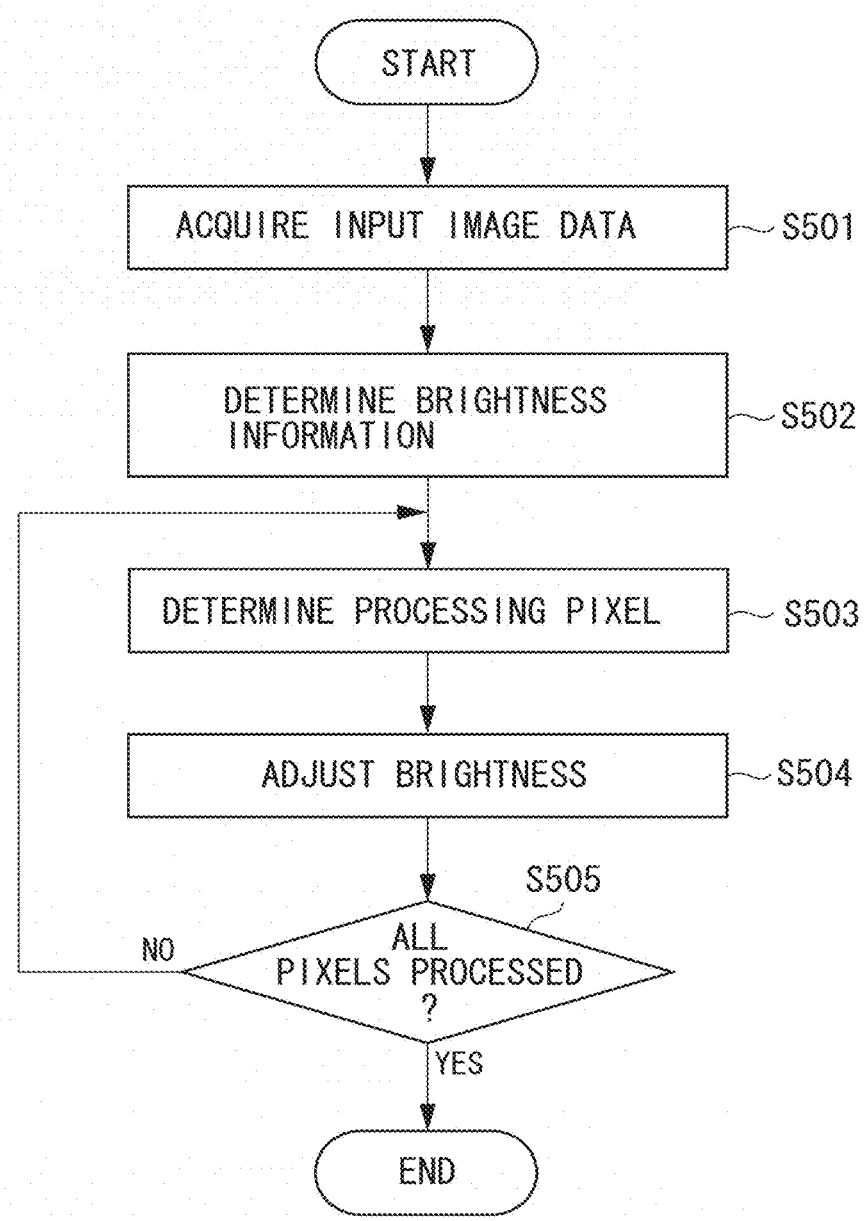
FIG. 5 is a flowchart illustrating processing for generating a brightness-adjusted image.

Brightness-adjusted image generation processing using the UI in FIG. 6 will be described below with reference to the flowchart in FIG. 5. In FIG. 5, in step S501, input image data is acquired from the image data input unit 301. The image representing the acquired input image data is displayed in the input image display region 601.

In step S502, the brightness information for adjusting the brightness of the input image is determined. The user determines the brightness adjustment amount by adjusting the slide bar 603. The result obtained by adjusting the brightness based on the determined adjustment amount is displayed in the preview display region 602.

Figure 7A:
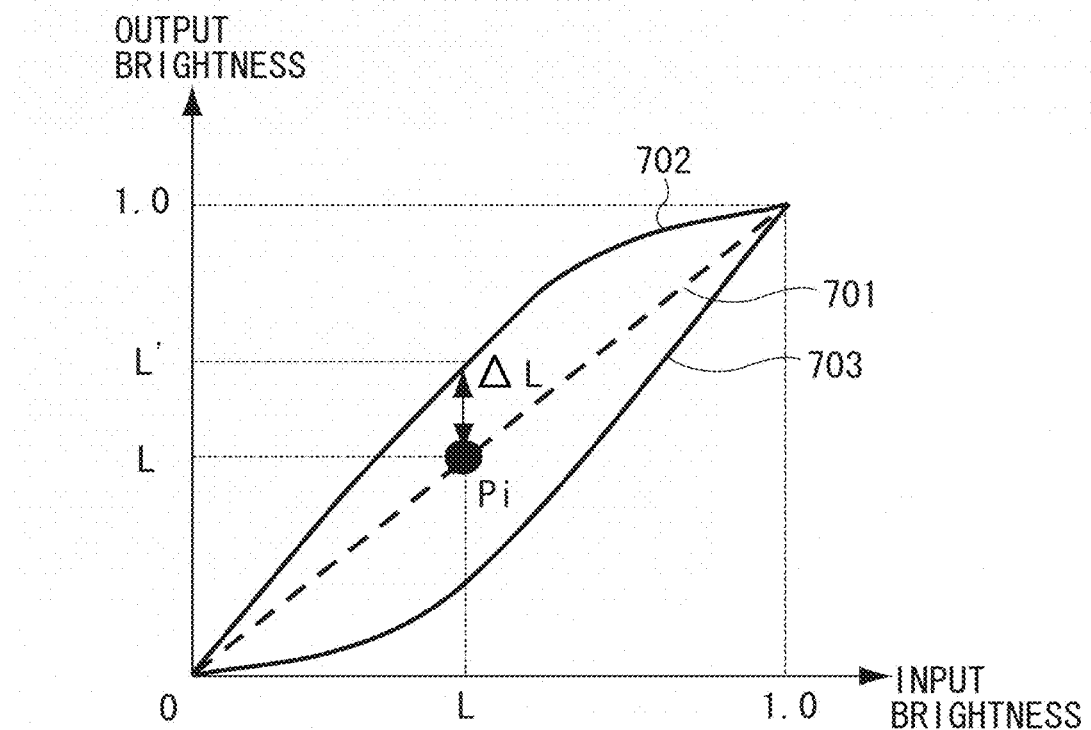
FIGS. 7A and 7B are schematic diagrams illustrating examples of a brightness information adjustment range.
Figure 7B:
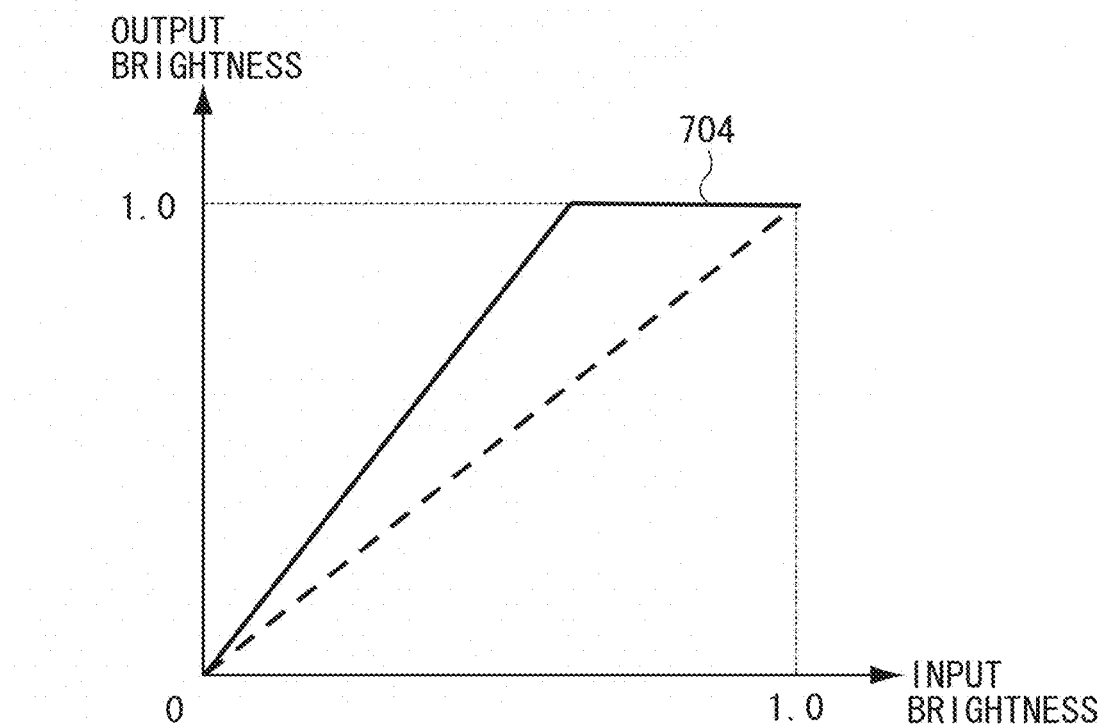

Here, an example of the brightness adjustment will be described with reference to FIG. 7A. In FIG. 7A, a broken line 701 indicates the state prior to the brightness adjustment. As the indicator of the slide bar 603 is moved to the right, the brightness information is determined such that the brightness-adjusted image is brighter as compared with the input image as indicated by a solid line 702. On the other hand, when the indicator of the slide bar 603 is moved to the left, the brightness information is determined such that the brightness-adjusted image is darker as compared with the input image as indicated by a solid line 703.

The UI for determining the brightness information and the brightness adjustment method are not limited to those of the present exemplary embodiment. An arbitrary UI capable of adjusting the brightness of an input image and an arbitrary adjustment method are applicable. After the determination of the brightness information, the execution button 604 is pressed, so that a brightness-adjusted image is generated based on the brightness information determined.

In step S503, processing pixels for brightness adjustment are determined from the input image. The processing pixels can be determined, for example, through movement from the upper left corner to the lower right corner of the input image as appropriate. Of course, the order in which the processing pixels are determined is not limited to the above-described one.

In step S504, the brightness of the processing pixels determined in step S503 is adjusted based on the brightness information determined in step S502. In the present exemplary embodiment, an example will be described in which a standard red, green, blue (RGB) (sRGB) image is transformed into a CIELAB color space for brightness adjustment. First, the brightness of the pixels determined in step S503 is obtained. First, an RGB value, which constitutes pixel data of the pixel, is transformed into CIEXYZ.

The transformation matrix from the RGB value to an XYZ value is as follows:

[Formula 1]

$$\begin{bmatrix} X \\ Y \\ Z \end{bmatrix} = \begin{bmatrix} 0.4124 & 0.3576 & 0.1805 \\ 0.2126 & 0.7152 & 0.0722 \\ 0.0193 & 0.1192 & 0.9505 \end{bmatrix} \begin{bmatrix} R \\ G \\ B \end{bmatrix} \quad (1)$$

Further, assuming that the white reference is XwYwZw, the brightness L of CIELAB is obtained from the following formulas:

[Formula 2]

$$\begin{cases} \text{when } \frac{Y}{Y_w} > 0.008856, L = 116.0\left(\frac{Y}{Y_w}\right)^{\frac{1}{3}} - 16.0 \\ \text{when } \frac{Y}{Y_w} \leq 0.008856, L = 903.29\left(\frac{Y}{Y_w}\right) \end{cases} \quad (2)$$

Next, the brightness is adjusted based on the brightness information determined in step S502. Assuming that the brightness difference obtained from the brightness information is delta L (ΔL), the brightness L' after the adjustment is obtained from the following equation:

[Formula 3]

$$L' = L + \Delta L \quad (3)$$

Finally, based on the brightness L' after the adjustment, the pixel value R'G'B' of the brightness-adjusted image is obtained. Here, an inverse operation of that when the brightness L is obtained from the pixel value RGB of the input image is applicable. The brightness adjustment method is not limited to the above-described one. For example, the pixel value of the input image may be based on AdobeRGB, or the RGB of an imaging device such as a camera, or cyan, magenta, yellow, and key (black) (CMYK) of an output device such as a printer. Regarding the color space for brightness adjustment, brightness adjustment can be performed in an arbitrary color space such as CIELUV or CIECAM.

In step S505, it is determined whether the brightness adjustment is completed on all the pixels of the input image. When the brightness adjustment has been completed on all the pixels (YES in step S505), the brightness-adjusted image generation processing is ended, otherwise (NO in step S505), the procedure returns to step S503 to continue the processing.

Finally, the end command is received upon the end button 605 being pressed, and the brightness-adjusted image data generation processing is completed.

[Restriction on Brightness Adjustment by Image Output Apparatus]

Through the above described brightness-adjusted image generation processing, it is possible to generate image data of an image differing from the input image in brightness. In the processing in step S502, in which the brightness information is determined, when, for example, the brightness reproduction range of the image output apparatus such as a printer is small, an excessive brightness adjustment may impair the gradation of the input image, making it impossible to obtain a desirable output. For example, as indicated by a solid line 704 in FIG. 7B, when the brightness is increased to an excessive degree to emphasize the luster texture, the gradation of the high-brightness region sticks to the maximum value of the output brightness, with the result that the gradation is lost.

In view of this, in the brightness adjustment processing in step S502, it is desirable to acquire the input and output brightness reproduction range beforehand and to restrict the maximum value or minimum value of brightness adjustment on the UI in correspondence with the adjustment amount of the slider. For example, the solid line 702 in FIG. 7A is regarded as the upper limit, and the solid line 703 therein is regarded as the lower limit, and the brightness adjustment may be made according to the brightness reproduction range of the device (e.g., the image output apparatus 208).

[Synthesized Image Generation Process]

Figure 8:
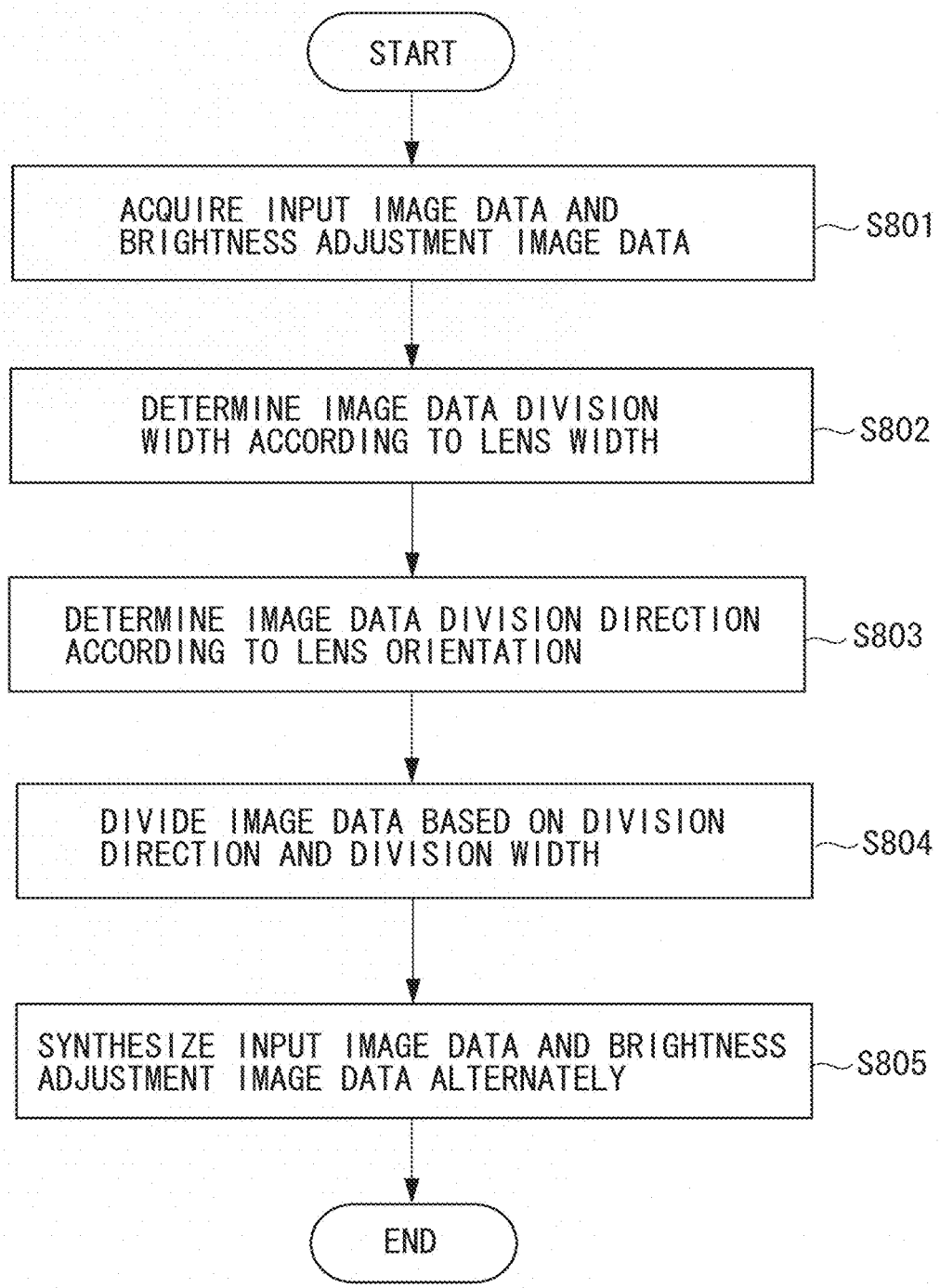
FIG. 8 is a flowchart illustrating processing for generating a synthesized image.

Synthesized image generation processing in step S403, in which the input image and the brightness-adjusted image are synthesized, will be described in detail below with reference to FIGS. 8 through 10.

First, the acquisition of the lens characteristics of the lenticular lens referred to when generating a synthesized image will be described. Referring to FIG. 9, an example will be described in which a user instruction is input from the UI called up from the image generation application software and displayed on the monitor 205. The interface specifying the lens characteristics is not limited to the one as illustrated in FIG. 9. An arbitrary interface can be used so long as it is capable of inputting the requisite lens characteristic information for the generation of the synthesized image.

Figure 9:
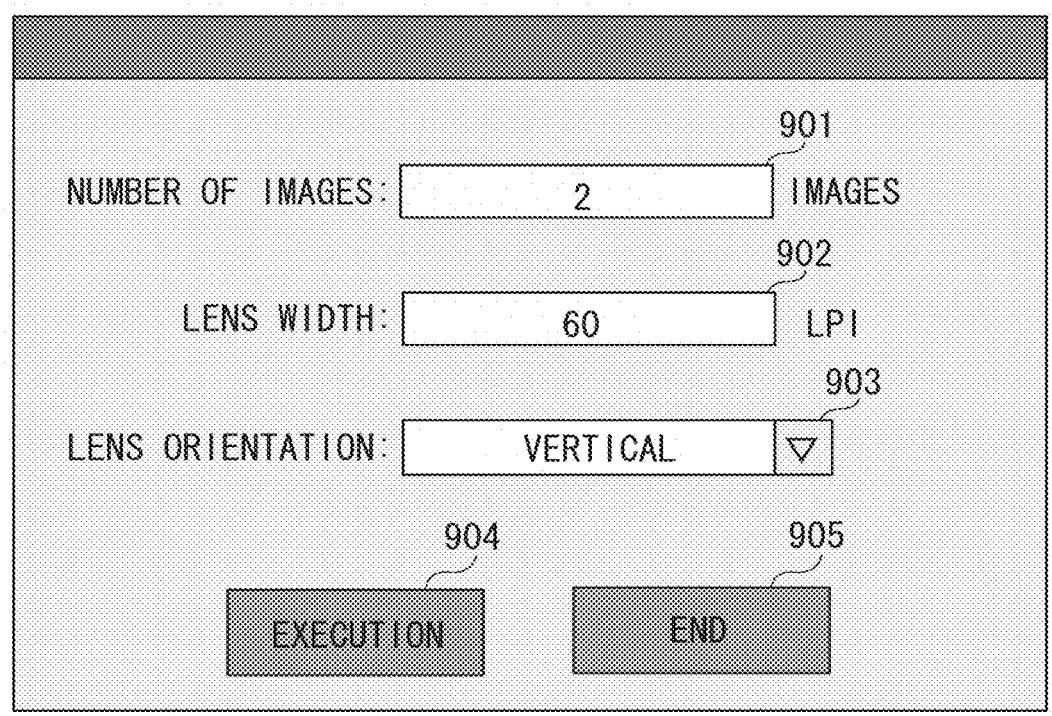
FIG. 9 is a schematic diagram illustrating an example of a user interface indicating lens characteristics.
Figure 10:
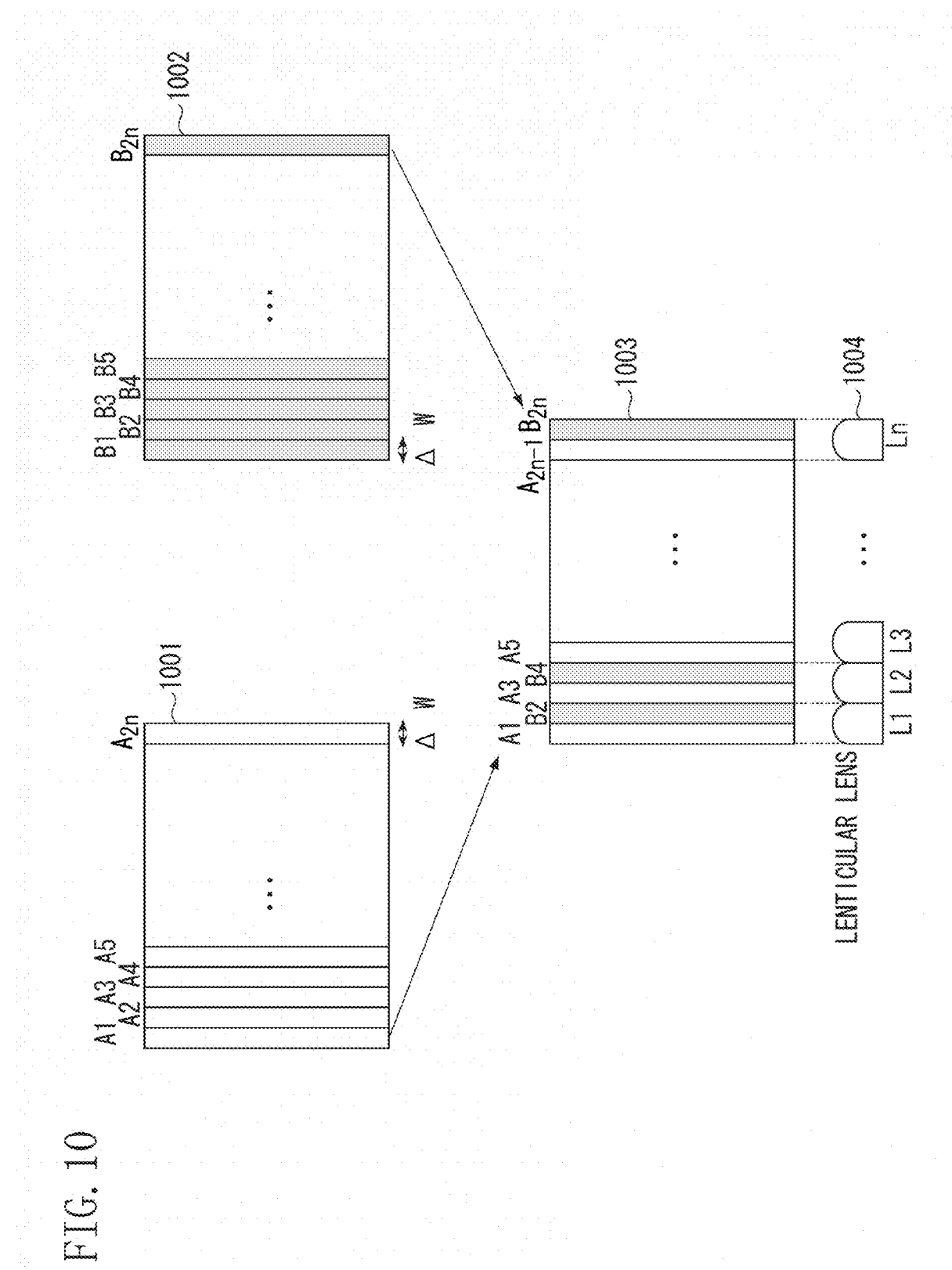
FIG. 10 is a schematic diagram for illustrating a synthesized image generation processing.

In FIG. 9, a text box 901 is used to specify the number of images to be synthesized. A text box 902 is used to specify the width of the lenticular lens. A combo box 903 is used to select the orientation of the lenticular lens. An execution button 904 is used to give an instruction to execute image synthesis based on the input lens characteristics. An end button 905 is used to give an instruction to end the synthesized image generation process.

The synthesized image generation processing using the UI in FIG. 9 will be described below with reference to the flowchart in FIG. 8.

In step 801, images are acquired in the number as specified in the text box 901. In the present exemplary embodiment, it is assumed that there are acquired two images, the input image and the brightness-adjusted image.

In step S802, according to the lens width specified in the text box 902, a division width for dividing the images acquired in step S801 into rectangular portions is determined such that a plurality of images differing in brightness are arranged within the width of each lens. For example, in the case of a lenticular lens of 60 LPI (Lenticules or Lens Per Inch, or Lines Per Inch), the lens width of each lens is 1/60 inches, so that, when two images are synthesized for the lenticular lens of 60 LPI, the division width of the image is 1/120 inches.

More specifically, the division width ΔW for synthesizing M images with a lenticular lens of W LPI is obtained by the following equation:

[Formula 4]

$$\Delta W = \frac{1}{W \times M} \quad (4)$$

In step S803, according to the orientation of the lens specified in the combo box 903, the image dividing direction is determined. According to the orientation of the lens when the images are observed, the combo box selects between vertical and horizontal. In the following description, it is assumed that the lens orientation is vertical. After the determination of the lens characteristics, the execution button 904 is pressed, so that image data of the synthesized image is generated based on the lens characteristics determined.

In step S804, the images acquired in step 801 are divided into rectangular portions based on the lens characteristics determined in step S802 and step S803. The division will be described in detail below.

In step 805, the images divided in step S804 are synthesized. The synthesis will be described in detail below.

Finally, an end instruction is received upon pressing of the end button 905, and the synthesized image data generation processing is completed.

Here, referring to FIG. 10, the image data division and synthesis processing in step S804 and step S805 will be described in detail. FIG. 10 illustrates an input image 1001, a brightness-adjusted image 1002, a synthesized image 1003, and a lenticular lens 1004.

First, in step S804, the input image 1001 and the brightness-adjusted image 1002 are vertically divided into rectangular portions of a width ΔW. More specifically, in FIG. 10, divided images A1 through A2n and divided images B1 through B2n are obtained.

Next, in step S805, the synthesized image 1003 is generated. In this process, the divided images are synthesized such that the divided image of the input image 1001 and the divided image of the brightness-adjusted image 1002 respectively correspond to the component lens of the lenticular lens and are arranged alternately. However, if all the divided images are synthesized, the width of the synthesized image becomes double the width of the input image, so that the divided images are partly thinned out to match the image width.

For example, an image A2$i$-1 and an image B2$i$ are synthesized so as to correspond to a lens Li (1<=i<=n). The method for matching the widths of the input image and the synthesized image is not limited to the above example, but it is also possible to adopt other methods so long as the input image and the brightness-adjusted image respectively correspond to the lenticular lens. For example, the images A2$i$ and B2$i$-1 may be made to correspond to the lens Li, or the width of the input image may be previously reduced to half and all the divided images may be used at the time of synthesis.

According to the present exemplary embodiment described above, the luster texture can be reproduced by combining an image output from the image data output unit 307 with a lenticular lens having the lens characteristics as input by the lens characteristics input unit 303. It is also possible to adopt some other method of combination, for example, printing may be directly performed on a back surface of the lenticular lens, or the lenticular lens and a separately output image may be affixed to each other.

In the first exemplary embodiment, brightness adjustment is made uniformly on the input image. On the other hand, there are cases where only a partial region requires luster texture or where the image includes a plurality of regions differing in luster texture. Thus, in a second exemplary embodiment described below with reference to FIGS. 11 through 13, an input image is divided into regions, and brightness adjustment processing is performed on each divisional region. Regarding the image generation processing other than the brightness adjustment processing, it is the same as that of the first exemplary embodiment, so a description thereof will be omitted, and the following description will center on the differences from the first exemplary embodiment.

Figure 12:
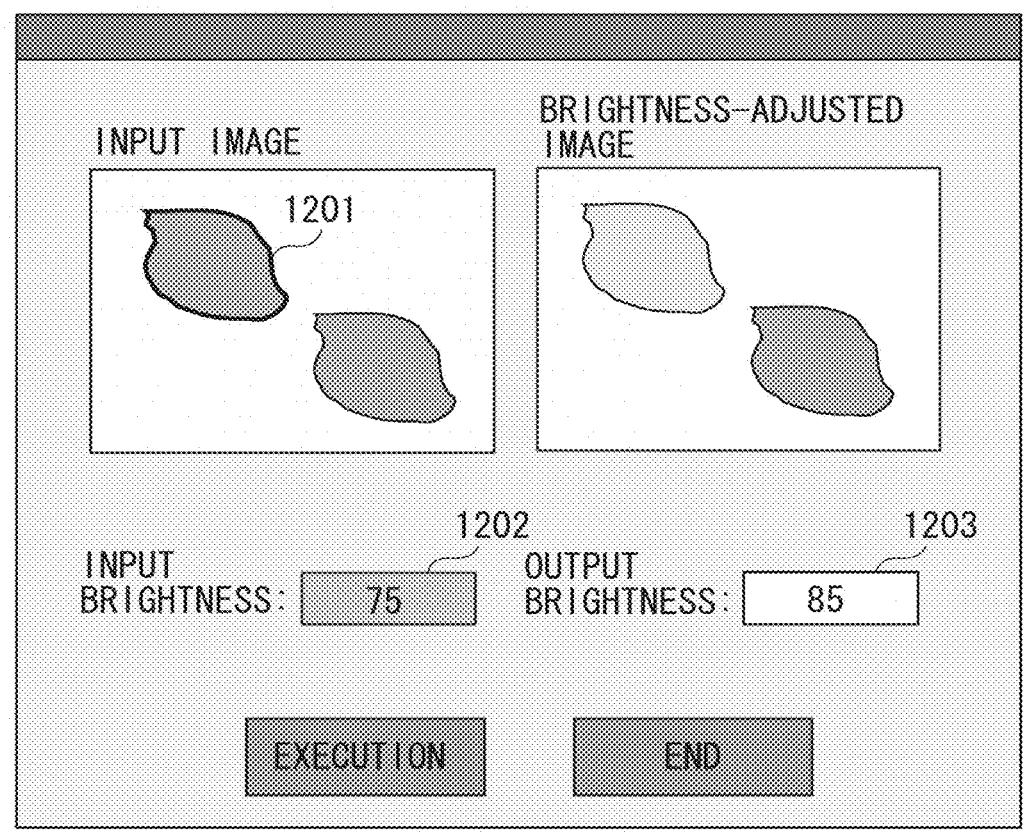
FIG. 12 is a schematic diagram illustrating an example of a user interface for giving an instruction for brightness adjustment for each region.

First, referring to FIG. 12, an example will be described in which a user instruction is input via the UI called up from the image generation application software and displayed on the monitor 205. However, a description of features common to those in FIG. 6 will be omitted. In FIG. 12, a brightness adjustment region 1201 is a region to be subjected to brightness adjustment.

An input brightness display area 1202 indicates the average brightness of the brightness adjustment region 1201.

A text box 1203 indicates a brightness value to adjust the average brightness of the brightness adjustment region and to be specified as brightness information.

Figure 11:
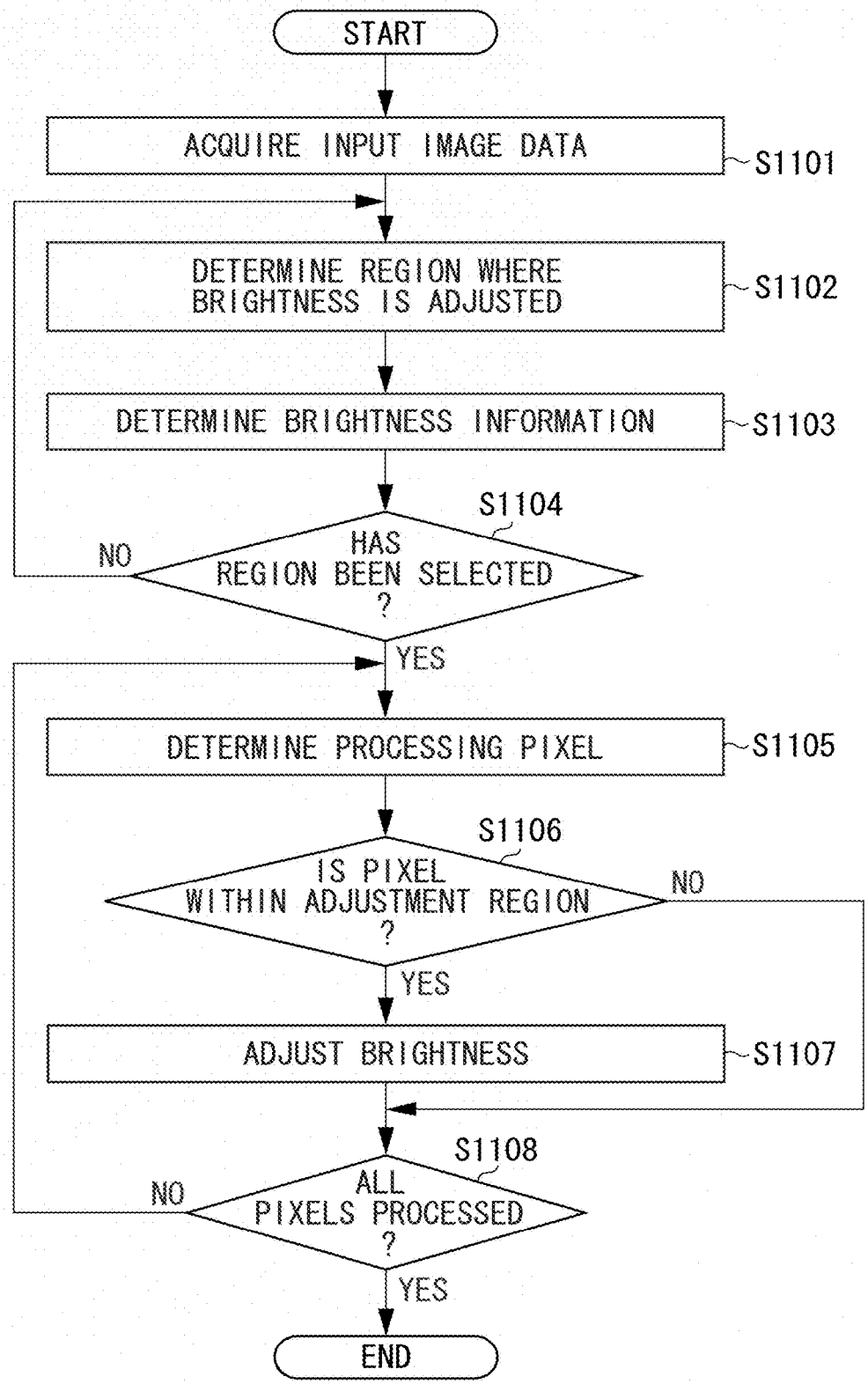
FIG. 11 is a flowchart illustrating processing for generating a brightness-adjusted image for reach region.

Referring to the flowchart in FIG. 11, a brightness-adjusted image generation processing using the UI in FIG. 12 will be described below. A description of the steps common to those described with reference to the flowchart in FIG. 5 will be omitted. In FIG. 11, the processing in step S1101 is similar to that in step S501.

In step S1102, the brightness adjustment region 1201 is determined from the input image displayed in the input image display region. In determining the brightness adjustment region, it is possible to adopt a desired method. For example, a user can manually set the region while referring to the input image display region, or a region of high brightness can be automatically extracted in the input image to select a luster region. While there is only one brightness adjustment region 1201 in FIG. 12, a plurality of regions can be simultaneously selected if the desired brightness information is the same.

In step S1103, the brightness information is determined. The user determines the brightness information while inputting a desired brightness value to the text box 1203.

Figure 13:
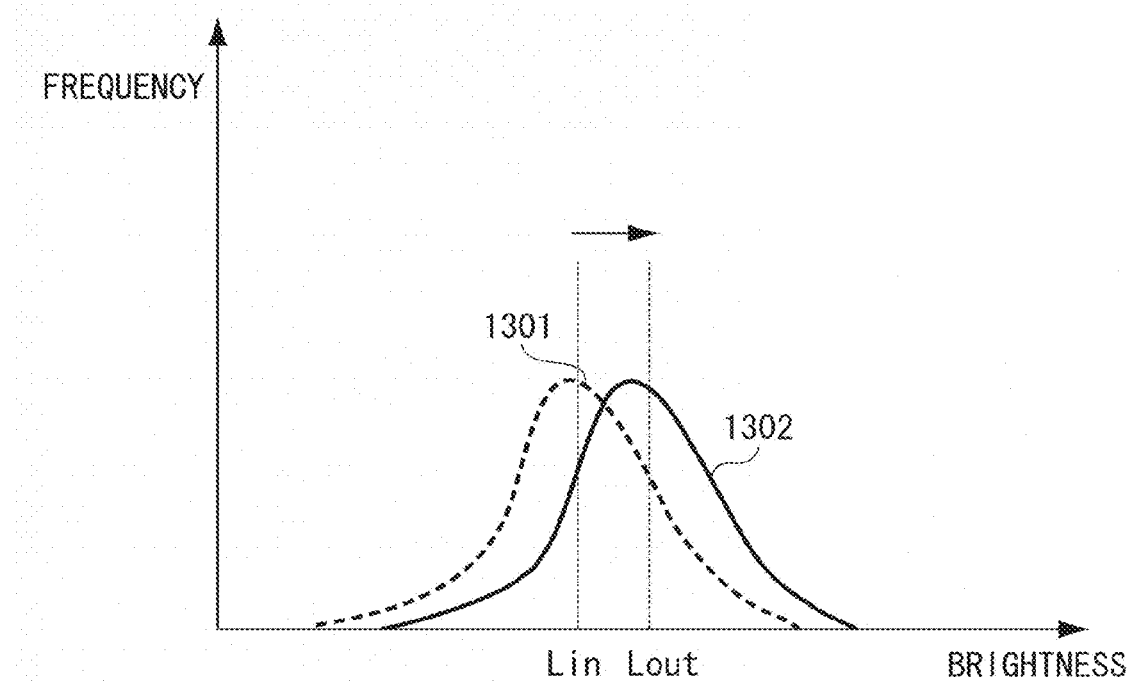
FIG. 13 is a schematic diagram illustrating an example of a brightness information adjustment range.

An example of the brightness adjustment processing will be described with reference to FIG. 13. First, when the brightness adjustment region 1201 is determined at S1102, the average brightness Lin of that region is calculated by the CPU 201 and displayed in the input brightness display area 1202. At the same time, a brightness histogram 1301 of the brightness adjustment region 1201 is calculated. Next, when the user inputs a desired output brightness value Lout to the text box 1203, the brightness histogram is shifted such that the average brightness of the brightness adjustment region 1201 is changed from Lin to Lout.

Then, the brightness information is determined from the difference between a resultant brightness histogram 1302 after the brightness adjustment and the brightness histogram 1301 before the adjustment. As in the first exemplary embodiment, regarding the UI for determining the brightness information and the example of the brightness adjustment processing, the method of the present exemplary embodiment using brightness histogram should not be construed restrictively. It is possible to adopt an arbitrary UI and an arbitrary method allowing adjustment of the brightness of an input image.

In step S1104, it is determined whether the selection of the brightness adjustment region is completed. When the brightness information about all the desired regions has been determined (YES in step S1104), the processing proceeds to step S1105. When there remains a region undetermined (NO in step S1104), the processing returns to step S1102 to determine the brightness adjustment region again.

The processing in step S1105 is similar to that in step S503.

In step S1106, it is determined whether the processing pixels determined in step S1105 are included in the brightness adjustment region determined in step S1102. If the processing pixels are within the brightness adjustment region (YES in step S1106), the processing proceeds to step S1107, and when they are outside the region (NO in step S1106), the processing proceeds to step S1108.

The processing in step S1107 and step S1108 are similar to those in step S504 and step S505 respectively.

By the above processing, it is possible to determine different pieces of brightness information for only a part of the input image or for a plurality of regions of the input image and to generate image data on a brightness-adjusted image. Thus, it is possible to obtain a luster texture differing for each region of the input image.

In the first exemplary embodiment described above, image data on two images of the input image and the brightness-adjusted image is synthesized. Here the number of images to be used for generating the synthesized image is not limited to two. It is also possible to synthesize image data on three or more images. For example, in the second exemplary embodiment described above, the region of the input image is divided, and brightness adjustment is performed for each divisional region. In this case, an image which has undergone brightness adjustment for each region, that is, image data of a first brightness-adjusted image and image data of a second brightness-adjusted image is generated, and these two pieces of image data are synthesized with image data of the input image to generate an output image. At this time, the number of images is specified as three from the text box 901 in FIG. 9, and the division width of each image is in accordance with formula (2). It is also possible to generate a synthesized image from three or more images.

Further, it is also possible to generate brightness-adjusted image data on two or more images, and to generate image data of a synthesized image solely from the brightness-adjusted image data without using the image data of the input image.

Further, embodiments can also be realized by supplying a system or an apparatus with a storage medium storing a program code of software realizing the function of the above-described exemplary embodiments (e.g., the function as illustrated in the above flowcharts). In this case, a computer of the system or the apparatus (a CPU or a micro processing unit (MPU)) reads and executes the program code readably stored in the storage medium, so that the function of the above exemplary embodiments is realized. As described with reference to the above exemplary embodiments, it is possible to reproduce luster texture by utilizing the characteristics of a lenticular lens.

Aspects can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium). In an example, a computer-readable medium may store a program that causes an image generation apparatus to perform a method described herein. In another example, a central processing unit (CPU) may be configured to control at least one unit utilized in a method or apparatus described herein.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-195707 filed Sep. 1, 2010, which is hereby incorporated by reference herein in its entirety.

What is claimed is:

1. An image generation apparatus comprising: at least one processor coupled to a memory; an acquisition unit configured to acquire image data of an object image; an input unit configured to input brightness information with respect to the acquired image; data and to input lens characteristics with respect to a lenticular lens; a first generation unit configured to adjust brightness of the acquired image data with the input brightness information to generate brightness-adjusted image data; and a second generation unit configured to generate luster reproduction image data by dividing the acquired image data into a plurality of pieces of acquired image data, dividing the brightness-adjusted image data into a plurality of pieces of brightness-adjusted image data, and arranging the plurality of pieces of acquired image data and the plurality of pieces of brightness-adjusted image data such that a plurality of images differing in brightness, including a piece of acquired imaae data and a piece of brightness-adjusted image data, are arranged within a lens width of each lens, wherein the at least one processor implements the acquisition unit, the input unit, the first generation unit, and the second generation unit.

2. The image generation apparatus according to claim 1, wherein at least one of the acquired image data, the brightness information, and the lens characteristics is received from an input of a user instruction.

3. The image generation apparatus according to claim 1, wherein the brightness information is one of a brightness difference and a brightness value.

4. The image generation apparatus according to claim 3, wherein the brightness difference or the brightness value is configured to be adjusted.

5. The image generation apparatus according to claim 1, wherein the lens characteristics include a lens width and a lens orientation.

6. The image generation apparatus according to claim 1, wherein one piece of acquired image data and one piece of brightness-adjusted image data are arranged within a lens width of each lens.

7. The image generation apparatus according to claim 1, wherein the luster reproduction image data is configured to cause a printing apparatus to impart an image onto a print medium so that the image observed on the print medium is an image with luster texture due to binocular luster.

8. The image generation apparatus according to claim 1, further comprising an output unit configured to output the luster reproduction image data to a printing apparatus cause the printing apparatus to impart an image onto a print medium so that the image observed on the print medium is an image with luster texture due to binocular luster.

9. The image generation apparatus according to claim 1, wherein the second generation unit generates the luster reproduction image data independent of a luminance reproduction range of a print medium.

10. The image generation apparatus according to claim 1, wherein the second generation unit generates the luster reproduction image data by alternately arranging the plurality of pieces of acquired image data and the plurality of pieces of brightness-adjusted image data.

11. The image generation apparatus according to claim 1, further comprising a determining unit configured to determine the brightness information, wherein the determining unit limits the brightness information to within a brightness reproduction range of a printing apparatus.

12. The image generation apparatus according to claim 1, further comprising a determining unit configured to determine a plurality of image data regions from the acquired image data and, for each image data region, determine whether the input unit input brightness information for that image data region,
   wherein the first generation unit adjusts brightness of each image data region having brightness information input for that image data region to generate the brightness-adjusted image data utilized by the second generation unit to obtain luster reproduction image data having a luster texture differing for at least two image data regions of the acquired image data.

13. The image generation apparatus according to claim 1, wherein the first generation unit generates, as the brightness-adjusted image data, at least first brightness-adjusted image data for a first image data region of the acquired image data and second brightness-adjusted image data for a second image data region of the acquired image data, and
   wherein the piece of brightness-adjusted image data arranged within a lens width of each lens includes at least one of a divided piece from the first brightness-adjusted image data and a divided piece from the second brightness-adjusted image data.

14. A method for an image generation apparatus, the method comprising: acquiring image data of an object image; inputting brightness information with respect to the acquired image data and inputting lens characteristics with respect to a lenticular lens; adjusting brightness of the acquired image data with the input brightness information to generate brightness-adjusted image data; and generating luster reproduction image data by dividing the acquired image data into a plurality of pieces of acquired image data, dividing the brightness adjusted image data into a plurality of pieces of brightness-adjusted image data, and arranging the plurality of pieces of acquired image data and the plurality of pieces of brightness-adjusted image data such that a plurality of images differing in brightness, including a piece of acquired image data and a piece of brightness-adjusted image data, are arranged within a lens width of each lens.

15. A non-transitory computer-readable medium storing a program to cause an image generation apparatus to perform a method, the method comprising: acquiring image data of an object image; inputting brightness information with respect to the acquired image data and inputting lens characteristics with respect to a lenticular lens; adjusting brightness of the acquired image data with the input brightness information to generate brightness-adjusted image data; and generating luster reproduction image data by dividing the acquired image data into a plurality of pieces of acquired image data, dividing the brightness-adjusted image data into a plurality of pieces of brightness-adjusted image data, and arranging the plurality of pieces of acquired image data and the plurality of pieces of brightness-adjusted image data such that a plurality of images differing in brightness, including a piece of acquired image data and a piece of brightness-adjusted image data, are arranged within a lens width of each lens.

* * * * *